United States Patent [19]

Lee et al.

[11] 3,929,001

[45] Dec. 30, 1975

[54] DEVICE FOR TESTING WEAR RESISTANCE OF DENTAL RESTORATIVE MATERIALS

[76] Inventors: Henry L. Lee, 3534 E. California, Pasadena, Calif. 91107; Jan A. Orlowski, 1304 Rubio Drive, Altadena, Calif. 91001; David V. Butler, 2825 E. Cortez, West Covina, Calif. 91791

[22] Filed: Apr. 29, 1974

[21] Appl. No.: 464,949

[52] U.S. Cl. ..................................................... 73/7
[51] Int. Cl.² ............................................. G01N 3/56
[58] Field of Search ............................................. 73/7

[56] References Cited
UNITED STATES PATENTS

| | | | |
|---|---|---|---|
| 955,630 | 4/1910 | Carney et al. | 73/7 |
| 2,251,681 | 8/1941 | Hathaway et al. | 73/7 |
| 2,319,485 | 5/1943 | Alabrune | 74/600 |
| 2,966,790 | 1/1961 | Walker | 73/7 |
| 2,990,712 | 7/1961 | Weber | 73/7 |
| 3,653,940 | 4/1972 | Ohlbaum et al. | 73/7 X |

FOREIGN PATENTS OR APPLICATIONS

| | | | |
|---|---|---|---|
| 832,806 | 2/1952 | Germany | 73/7 |

*Primary Examiner*—Richard E. Aegerter
*Assistant Examiner*—Charles E. Phillips
*Attorney, Agent, or Firm*—Irons & Sears

[57] ABSTRACT

A device and method are disclosed for testing the wear resistance of dental restoratives to toothbrushing. The apparatus consists of a rotating sample holder, a mounting frame adapted to hold means for abrading the sample and a reciprocating mechanism connected to the mounting frame for stroking the abrading means held in the mounting frame cyclically across an exposed surface of the composite dental restorative held in the sample holder.

1 Claim, 1 Drawing Figure

U.S. Patent  Dec. 30, 1975  3,929,001
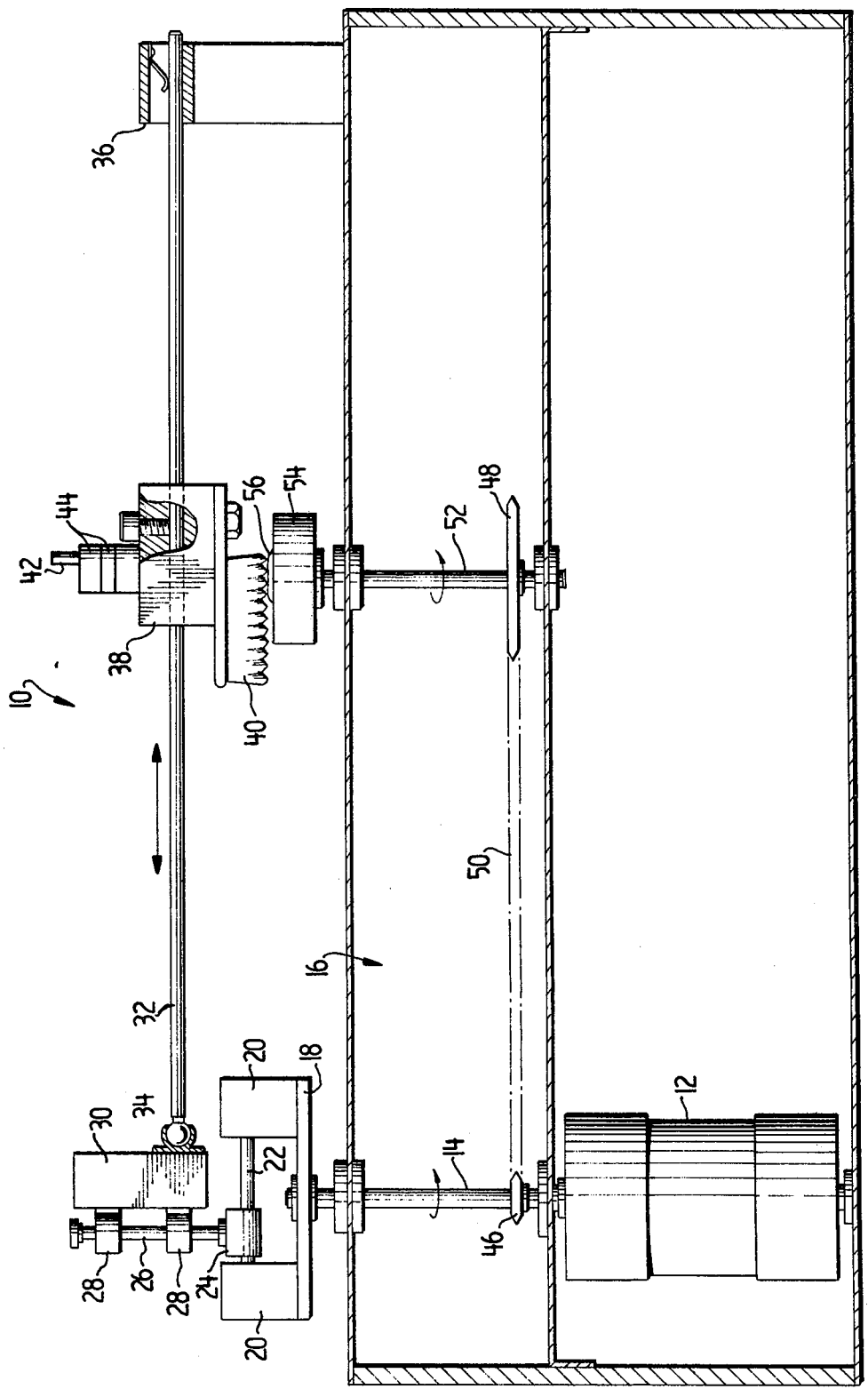

DEVICE FOR TESTING WEAR RESISTANCE OF DENTAL RESTORATIVE MATERIALS

BACKGROUND OF THE INVENTION

1. Field of the Invention

The invention relates to an apparatus and a method for simulating the effects of toothbrushing on dental restoratives. More particularly, the invention relates to an apparatus for measuring the wear resistance of dental restoratives to the stroking action of a toothbrush.

2. Description of the Prior Art

In-vivo testing on human subjects is slow and costly and thus not of great value in selection or design of improved restorative formulations. On the other hand, data available from in-vitro testing procedures do not accurately predict the actual wear losses of restoratives in clinical use.

Various apparatus have been developed for obtaining wear resistance data on composites and amalgam restoratives. The following articles disclose apparatus for obtaining wear resistance data for restorative materials:
1. Hollenback, G. M.; Villanyi, A. A.; and Shell, J. S.; A Report on the Physical Properties of a New Restorative Material (Addent), *J. So. Cal. Dent. Assn.* 34: 250–255, 1966.
2. Shell, J. S.; Hollenback, G. M. and Villanyi, A. A.: Comparative Abrasion Rates on Restorative Materials, *J. Cal. Dent. Assn.* 42: 521–524, 1966.
3. Hollenback, G. M.: A Further Report on the Physical Properties of Five Composite Resins, Part II, *J. Alabama Dent. Assn.* 55: 17–33, 1971.
4. Eames, W. B.; and O'Neal, S. J.: A comparison of Three Abrasion Test Methods, paper presented at 50th Annual Meeting of the IADR 1972.
5. Tillitson, E. W.; Craig, R. G.; and Peyton, F.A.: Friction and Wear on Restorative Dental Materials, *J. Dent. Res.* 50: 149–154, 1971.

Unlike the present invention, close simulation of the abrading action of toothbrushing upon in-vivo restoratives is not achieved by any apparatus disclosed in the aforementioned articles.

Other publications which relate to in-vitro wear tests of human teeth are:
1. Manly, R. S., and Brudevold, F.: Relative Abrasiveness of Natural and Synthetic Tooth Brush Bristles on Cementum and Dentin, *JADA* 55: 779–780, 1957.
2. Manly, R. S.; Wiren, J.; Manly, P. L.; and Keene, R. C.: A Method R. S.; Measurement Abrasion of Abrasionof Dentin by Toothbrush and Dentrifice, *J. Dent. Res.* 44: 533–540, 1965.
3. McConnell, D.; and Conroy, C. W.: Comparison of Abrasion Produced by a Simulated Manual Versus a Mechanical Toothbrush, *J. Dent. Res.* 47: 1022–1027, 1967.

No apparatus disclosed in the above-identified publications applies a reciprocating brushing action upon a sample (either a restorative composition or a human tooth) which is revolved slowly during said brushing to prevent channeling and uneven wear.

U.S. Pat. No. 2,895,326 discloses a rug wear testing machine having a rotary rug sample holder which is subjected to wearing action by a horizontally reciprocating shoe.

SUMMARY OF THE INVENTION

The present invention provides a simple and inexpensive apparatus for procuring data on the wear resistance of dental restoratives to simulated toothbrushing. In particular, the primary parts of the apparatus are a reciprocating mechanism having means for attaching a toothbrush thereto and a sample holder which is slowly revolved in conjunction with movement of the reciprocating mechanism to prevent uneven wear of the sample. Means are provided for adjusting the stroke of the reciprocating mechanism. A weight mounting assembly is associated with the means for attaching the toothbrush to the reciprocating mechanism to permit adjustment of the normal force of the toothbrush on the sample.

BRIEF DESCRIPTION OF THE DRAWINGS

FIG. 1 is a front view of the present invention.

DETAILED DESCRIPTION OF THE INVENTION

Referring to the drawing, the toothbrushing simulator 10 is powered by a conventional electrical motor 12 having a shaft 14 extending up through housing 16. Secured to shaft 14 is a plate 18 having a pair of metal mounting blocks 20 secured thereto. Viewed from the top, the center line of the mounting blocks 20 extends through the center of shaft 14. Horizontally disposed shaft 22 is secured within mounting blocks 20 off-center from the axis of shaft 14. Mounting block 24 slideably engages shaft 22 to permit adjustment of the stroke of brush or abrading means 40. Plate 18, mounting blocks 20, shaft 22 and an additional mounting block 24 a shaft 26, a pair of collars 28, another mounting block 30 and a ball joint 34 comprise a rotatable coupling for stroking arm 32. A set screw (not shown) is tapped into mounting block 24 to permit fixed engagement with shaft 22. Extending vertically upward from mounting block 24 is shaft 26. A pair of collars 28 are rotatably secured to shaft 26. Collars 28 are fixedly attached within mounting block 30. Arm 32 is rotatably journaled to mounting block 30 at one end by ball joint 34 and slideably journaled in V bearing 36 at the other end. Secured to arm 32 is a mounting frame 38 which has a mounting bracket to hold toothbrush 40. Projecting upward from mounting frame 38 is a shaft 42 which is used to anchor weights 44 which may be disposed thereon to vary the pressure exerted by toothbrush 36 on sample 56. A transmission consisting of pinion gear 46, gear 48, chain 50 and shaft 52 means for rotating sample holder 54. It should be apparent to those skilled in the art that other types of transmissions may be used with equal facility for driving sample holder 54. The sample holder 54 may be circular in shape and has the preferred dimensions of a 25 mm diameter and a 5 mm recess for holding sample restoratives.

OPERATION

The operation of the invention is summarized as follows. Motor 12 powers all moving parts in the present invention. Because of the center offset of horizontal shaft 22 from motor shaft 14, reciprocating motion is produced between brush 40 and sample 56 when shaft 14 rotates. Collars 28 and ball joint 34 permit pivoting of arm 32 about rotating shaft 26. The length of stroke of brush 40 is governed by adjustment of mounting block 24 upon horizontal shaft 22. Upon the securing of a sample dental restorative within 50, the normal force exerted thereon by brush 36 is adjusted by the addition or removal of weights 44 from vertical shaft 42. The gearing ratio between pinion gear 46 and gear 48 reduces the rate of rotation of the sample holder 54. The preferred relative rate of motion between brush 40 and sample holder 54 is 360 strokes of 15 mm in length to 84 revolutions of sample holder 54 per minute. As is apparent from the above description, brush 40 reciprocates across the surface of slowly rotating sample 56 contained in holder 54.

From the foregoing, it may be readily understood that the invention provides a low cost, reliable apparatus and method for simulating the wear caused by toothbrushing upon dental restoratives.

As will be apparent to those skilled in the art, many modifications may be made to the invention without departing from the spirit and scope thereof. Accordingly, the invention is not limited to the exact form and arrangement in the embodiment disclosed.

What is claimed is:

1. A device for use in testing the wear resistance of composite dental restoratives comprising:
   a sample holder adapted to receive and hold a sample of composite dental restorative whose wear resistance is to be tested;
   means connected to said sample holder for rotating the same;
   means for abrading said composite dental restorative;
   a mounting frame adapted to hold said means for abrading said composite dental restorative;
   a reciprocating mechanism mechanically coupled to said mounting frame for stroking said abrading means held in said mounting frame cyclically across an exposed surface of said composite dental restorative held in said sample holder when said rotating means is operative;
   wherein said reciprocating mechanism comprises a motor having a shaft secured thereto; a rotatable coupling attached to said shaft; and an arm mechanically coupled between said rotatable coupling and said mounting frame;
   and wherein said rotatable coupling comprises a mounting plate secured to said motor shaft; a pair of mounting blocks secured to said mounting plate; a shaft secured within each of said mounting blocks and extending therebetween; said shaft being off-center from the axis of said motor shaft; an additional mounting block slideably engaging said shaft secured between said pair of mounting blocks and being adapted to be fixedly secured to said shaft; a shaft secured to said additional mounting block and projecting away therefrom; at least one collar rotatably secured to said shaft secured to said additional mounting block; a mounting block secured to said collar; and a ball joint attached to said mounting block secured to said collar and to said arm.

* * * * *